April 24, 1956

L. A. OHLINGER 2,743,224

SUBMERGED REACTOR

Filed June 14, 1946

Inventor:
Leo A. Ohlinger
By Robert M. Fairchild
Attorney

April 24, 1956  L. A. OHLINGER  2,743,224
SUBMERGED REACTOR
Filed June 14, 1946  8 Sheets-Sheet 7

Inventor
Leo A. Ohlinger
By
Attorney

Fig. 9.

Inventor:
Leo A. Ohlinger

United States Patent Office 2,743,224
Patented Apr. 24, 1956

2,743,224
SUBMERGED REACTOR

Leo A. Ohlinger, Chicago, Ill., assignor to the United States of America as represented by the United States Atomic Energy Commission Application June 14, 1946, Serial No. 676,598

1 Claim. (Cl. 204—193)

This invention relates to neutronic reactors, and more particularly to the cooling and personnel shielding thereof.

For purposes of illustration, a reactor of the general type disclosed in the copending application of Fermi and Szilard, Serial No. 568,904, filed December 19, 1944, now Patent No. 2,708,656, issued May 17, 1955, is described herein with certain modifications for effecting more economical cooling and shielding in accordance with the principles of the present invention, the application of these principles to other types of reactors being readily apparent from the illustrative example.

One of the principal objects of the present invention is to utilize bodies of water directly as personnel shielding means and cooling means for a neutronic reactor.

Another object is to arrange a water shield in such a way with respect to a reactor that it serves as a reservoir from which sufficient head is derived for forcing the water as a coolant through the reactor if the pump fails which is normally used to force cooling water through the reactor.

Another object is to provide safety cooling means for a neutronic reactor which functions to cool the reactor even though normal pumping means fail.

Other objects and advantages will become apparent from the following description wherein reference is made to the drawings in which.

Figures 1, 3:
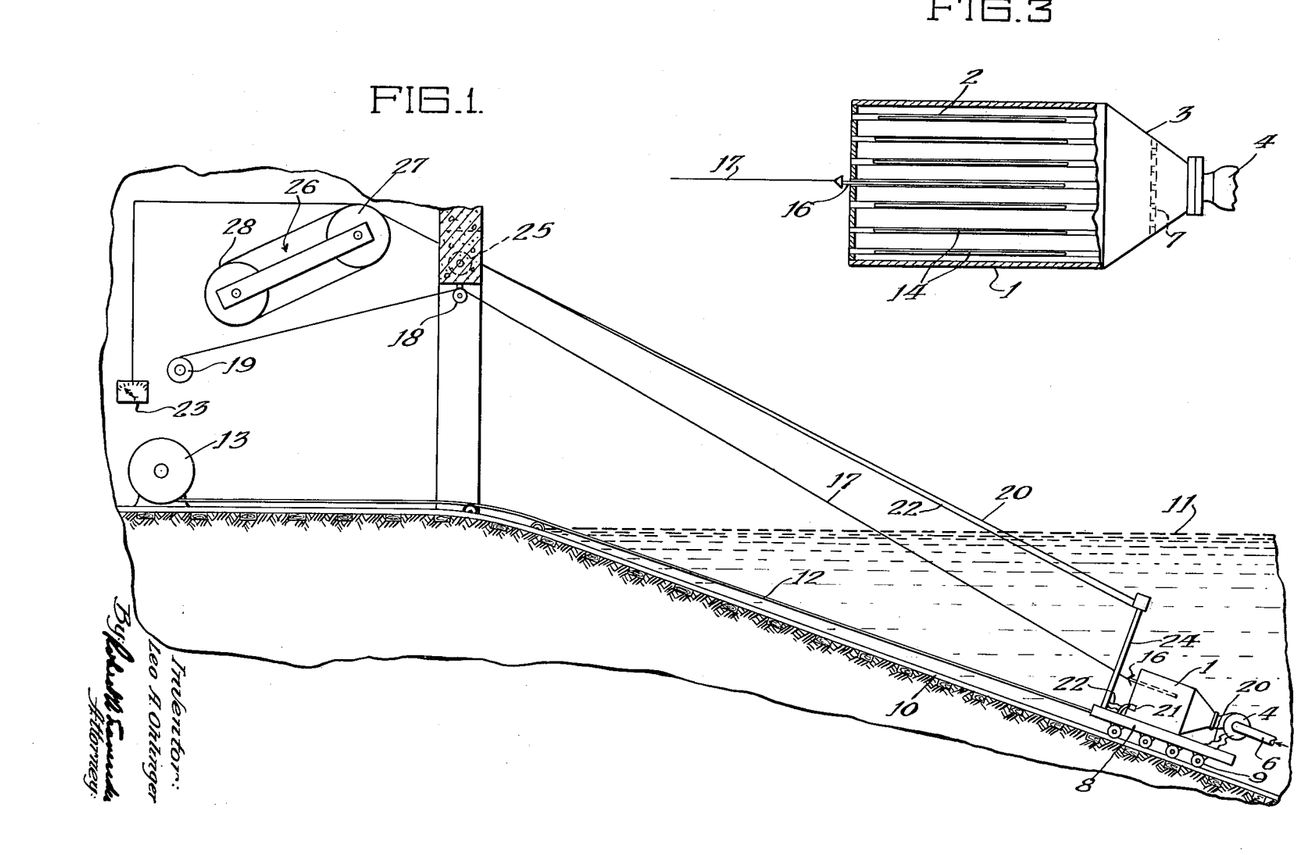
Fig. 1 is a diagrammatic side elevation of a submerged reactor and associated apparatus forming one embodiment embodying the principles of the present invention.
Fig. 3 is an enlarged, diagrammatic, fragmentary-longitudinal sectional view of the reactor, the view being shown partly in elevation.
Figure 2:
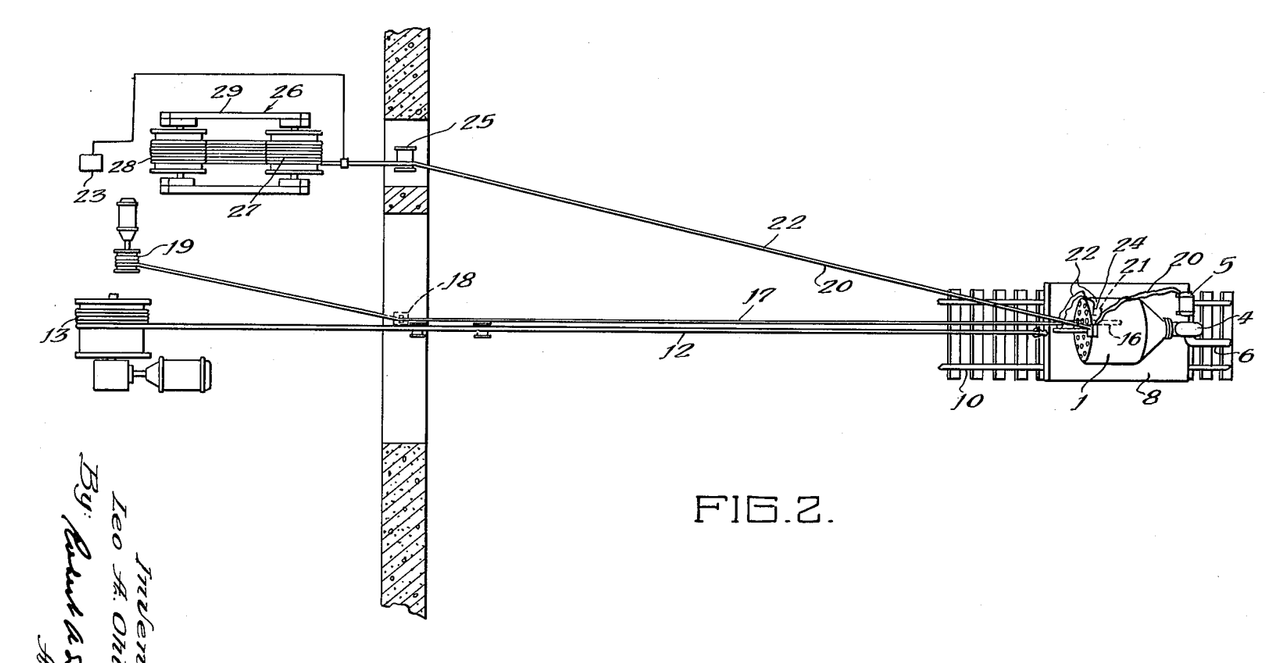
Fig. 2 is a diagrammatic top plan view of the submerged reactor and associated apparatus illustrated in Fig. 1.

Referring to Figs. 1 to 3 of the drawings, the reactor shown therein comprises generally a metal cylindrical tank 1 of stainless steel, aluminum, or other suitable metal, which is closed at the ends. A plurality of imperforate parallel aluminum cooling tubes 2 extend completely through the tank 1 and open through the ends thereof. The tubes 2 are in sealed engagement with the ends of the tank 1 so as to prevent the entrance of cooling water into the tank 1 while affording relatively free passage of cooling water through the tubes.

A frusto-conical header 3 is secured to one end of the tank 1 in coaxial relation therewith, its larger base being open and sealed to the end of tank 1 about the circumference thereof. At the smaller base of the header 3 is a suitable rotary pump 4 driven by a motor 5, the discharge side of the pump 4 being connected to the smaller base of the header 3. An inlet pipe 6 is connected to the inlet side of the pump 4. A perforated plate 7 preferably is interposed between the pump outlet and the end of the tank 1 to which the header 3 is connected so as to effect better distribution of the water to the tubes 2 and to obtain a more nearly uniform pressure and velocity of flow through the tubes relative to each other. Other water distribution means obviously may be employed.

The apparatus described is fixedly mounted on a suitable car 8 having flanged wheels 9 which operate on an inclined track 10 which extends from normal ground level downwardly to the desired depth below the water level of a natural body of cold water 11, such as a glacial lake, the ocean, or a cold river.

The term "natural" body of water is meant to include, in addition to its normal meaning, large bodies of water in the open created by dams and the like in natural streams, deepened shallow lagoons, reservoirs, lakes, and other man made open bodies of water of extensive size which depend on the natural ground for the major portion of their resulting basins. As examples, the lakes created by Boulder Dam, Grand Coulee, and the like, are considered "natural" bodies of water within the teaching of the present invention.

The car 8 is raised and lowered by means of a cable 12 and power driven windlass 13.

Rods 14 of fissionable metal, such as uranium, are suitably supported and secured in the tubes 2 with radial clearance. Preferably, the tubes 2 are provided with longitudinal ribs for centering the rods 14 therein to provide water passages between the tube walls and their associated rods. The rods 14 are sealed in, and intimately bonded to the walls of, aluminum or beryllium jackets.

One or more control rods 16 of neutron absorbing material, such as boron or cadmium are provided in selected tubes 2. Connected to the upper end of each control rod 16 is a cable 17 by which the rod may be withdrawn to any degree desired from its associated tube 2 or lowered therein by gravity or other means for effecting proper control. The cable 17 is led over a roller or drum 18 to a power driven windlass 19.

The tank 1 in one embodiment is made of stainless steel and is about 7 feet 4 inches in length and 6 feet in diameter. The tubes 2 are composed of aluminum and have relatively thin walls. In the form illustrated, one hundred and thirty-six tubes are provided and are evenly distributed throughout the cross section of the tank 1. The rods are of uranium and are sealed in aluminum jackets of 1.10 inches in diameter having a wall thickness of 0.035 inch. These rods fit in the tubes 2 with a radial clearance and weigh about 42 pounds each.

The tank 1 is filled with a neutron moderating material, heavy water ($D_2O$) being preferred as it is not only effective as a moderator but is a liquid which can be operated at any pressure and distributes and counteracts the external stresses imposed in the tank by outside water pressure when the tank 1 is submerged.

Usually a depth of 18 feet of water is a minimum adequate for shielding of personnel, but it is preferable to operate at a depth providing a considerable factor of safety. Also, the temperature of the water is lower at greater depths, and dispersion of the discharge water as it travels upwardly and before it reaches the surface is greater. However, the selected depth below the minimum recited can be determined readily for the particular body of water.

In operation, after submersion, the motor 5 is started and continues to operate while the reactor is submerged. The rods 16 of neutron absorbing material are manipulated in the well-known manner to bring the reactor to the desired operating power.

Electric power is preferred for pump operation, the motor 5 therefor being supplied with current by a power line 20 led thereto from a suitable source. The capacity of the pump and the electric power required vary, depending on the water temperature and the power output of the reactor.

Monitoring devices, such as an ion chamber 21, are provided in the reactor so as to determine its neutron density and other operating characteristics. If desired, all such monitoring devices may be connected through a suitable electrical conductor 22 to a suitable gauge or indicator 23 located conveniently for observation by personnel ashore.

In order to prevent tangling of the electric cables 20 and 22, a hollow mast 24 is provided on the car 8 and the cables are led therethrough from the motor 5 and ion chamber 21 and anchored in an anchor box at the top of the mast. From the mast 24, the cables extend over a roller 25 onto a multiple pulley tandem type of slack eliminator 26, of which one set of pulleys 27 operates on a fixed shaft and the other set of pulleys 28 operates on a travelling shaft movable by gravity down an inclined track 29.

After the reaction has progressed to the final degree desired and the material of the reactor has become relatively inactive, the reactor is withdrawn from the water and its contents dumped into a suitable receptacle for further processing, or the contents may be dissolved in situ in the reactor and further processed. Other unloading means obviously may be employed.

Thus the natural body of water is used to provide an effective shield and cooling means, especially in the case of glacial lakes in which water is usually very cold, relatively pure and protected from surface disturbances.

By pumping the colder water from a level below the reactor and discharging it upwardly therefrom the warmer discharge water is removed naturally from the site of the reactor and from the intake.

The present type of cooling and shielding of a reactor, in addition to facilitating the producing of the usual reactor products, has advantages for use in connection with submarine, surface craft, and the like, as it can be suspended from the craft in rigidly fixed position and craft be shielded therefrom by the intervening water, thus eliminating one of the main objections to reactors as motive power production, namely, the heavy and large biological shield which would be required for operation of the reactor in the craft itself.

Figure 4:
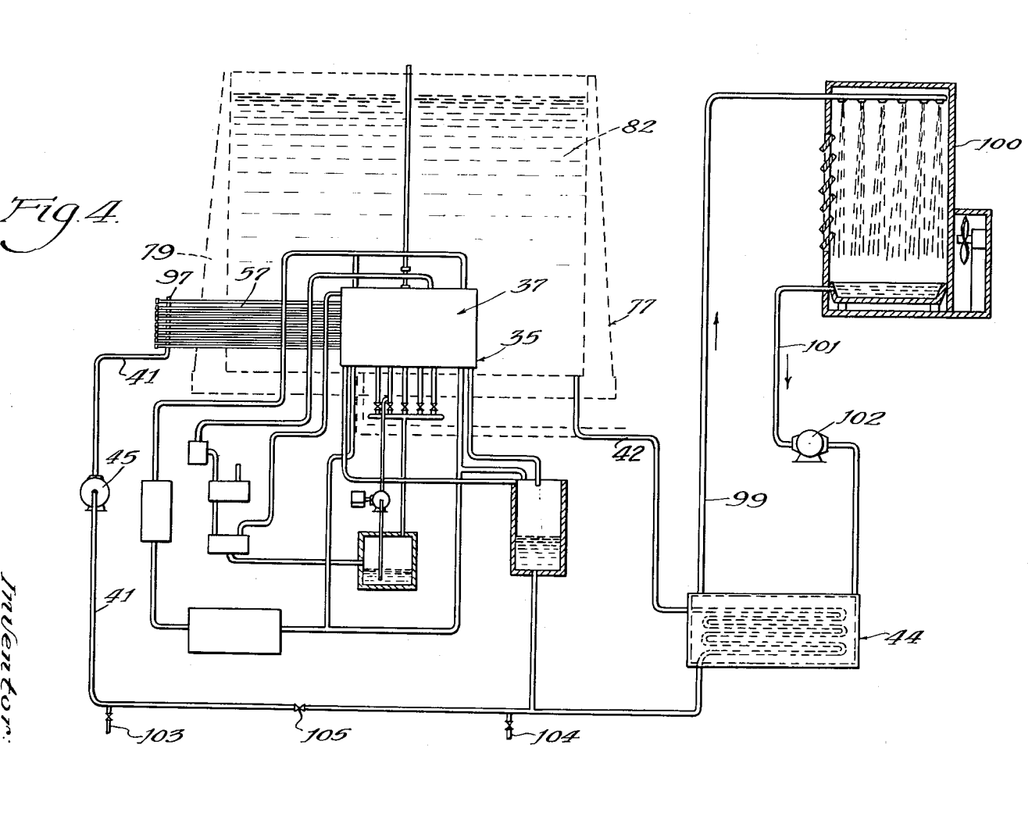
Fig. 4 is a schematic view of the reactor enclosed in a water and concrete shield showing primarily the cooling water circuit, the view illustrating a second embodiment of the invention.
Figure 5:
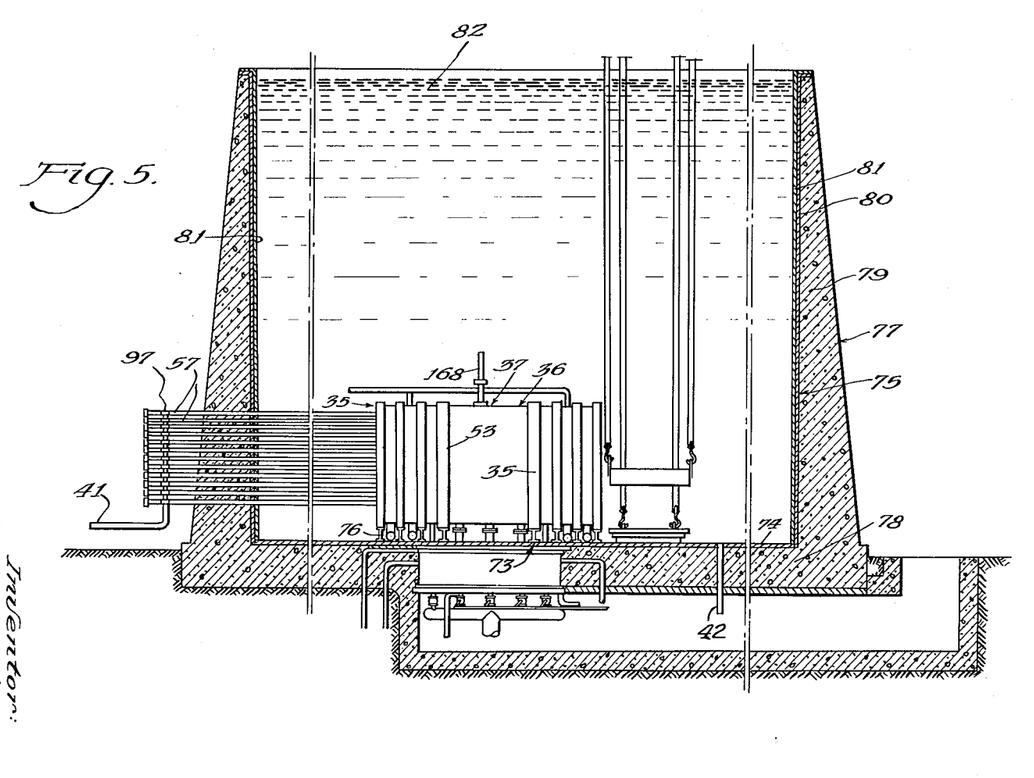
Fig. 5 is an enlarged side elevational view of the reactor, shown in Fig. 4, surrounded by the water.
Figure 6:
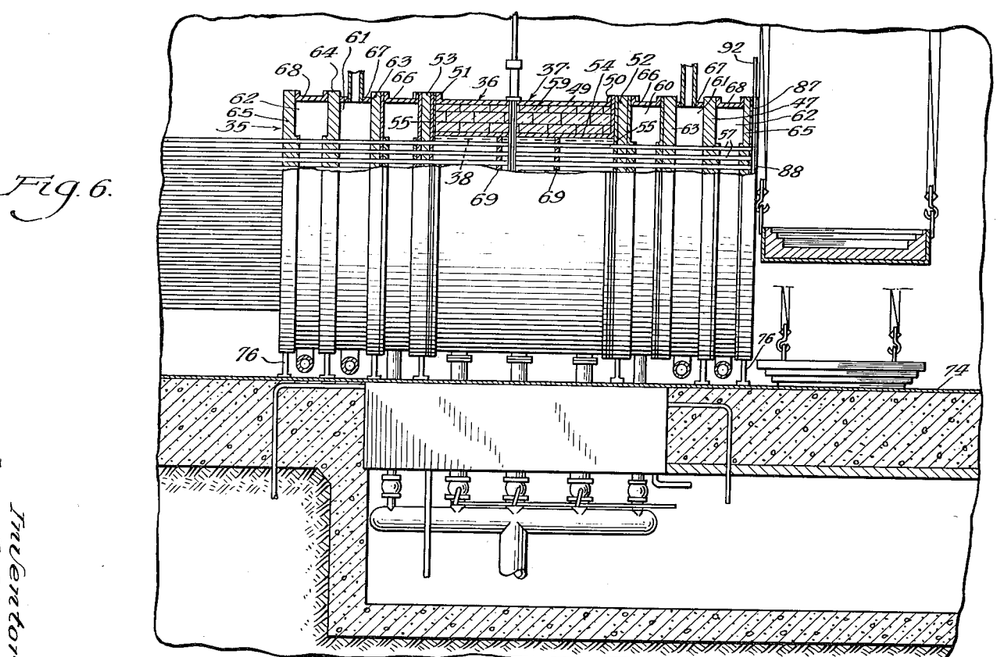
Fig. 6 is an enlarged vertical longitudinal sectional view of the reactor shown in Fig. 4 and taken through the reactor and coffin, shown partially in elevation.

Referring now to Figs. 4 to 6 inclusive, a second embodiment of the invention is shown wherein the reactor is illustrated at 35 and consists essentially of an elongated, horizontally disposed cylindrical tank or shell. Reference is made to the copending application of Eugene P. Wigner, Leo A. Ohlinger, Gale J. Young, and Alvin M. Weinberg, Serial No. 613,355, filed August 29, 1945, for a more complete disclosure of the reactor. The central portion 36 of the reactor is the active part of the system wherein the neutronic reaction takes place and comprises a cylindrical tank 37 containing a body of heavy water indicated at 38. This tank 37 may be referred to as the reactor tank and comprises a horizontally disposed cylindrical, aluminum lined steel tank about 8 feet in diameter and 9 feet long containing approximately 10 tons of heavy water.

In all there are approximately 460 uranium rods disposed in the reactor arranged in a square geometry with the rods spaced about 4 inches apart center to center. Each rod is approximately 2 centimeters in diameter and about 7 feet long and in this example comprises natural uranium metal.

Figures 8, 10:
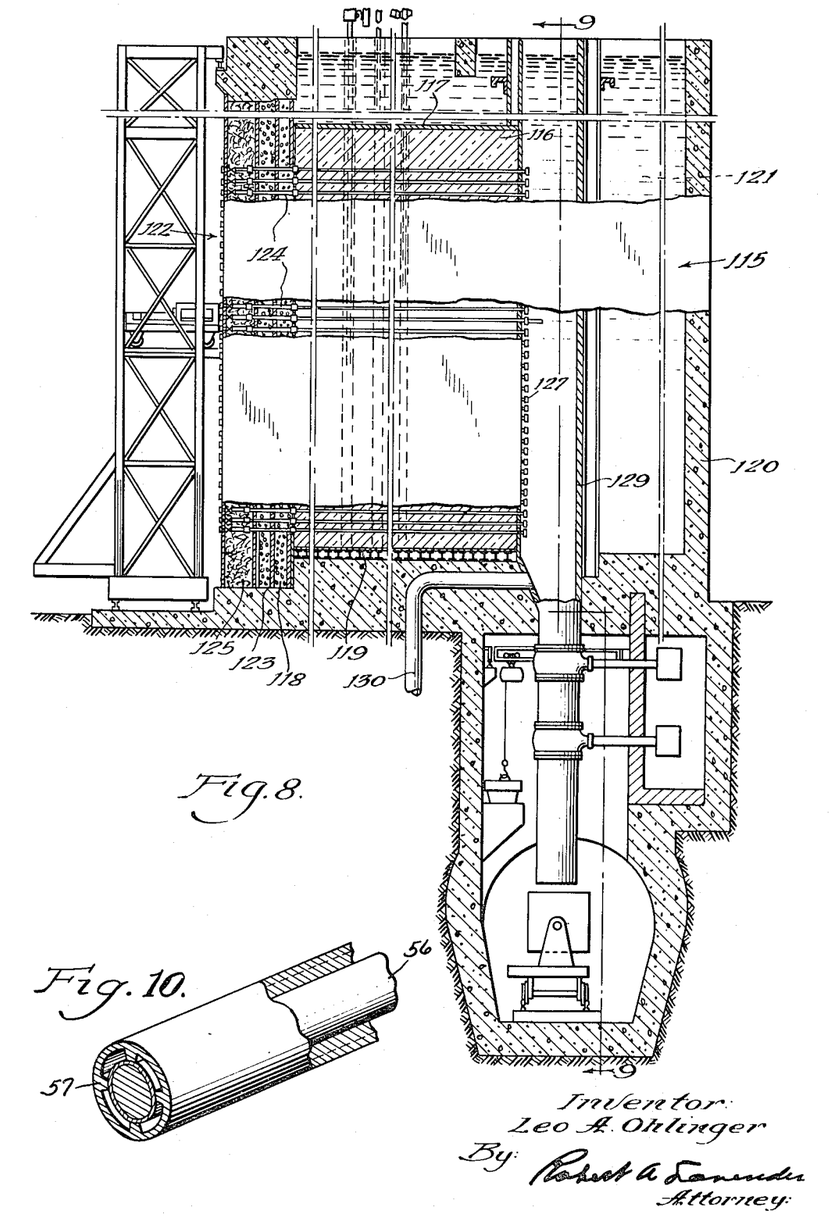
Fig. 8 is a vertical sectional view through the reactor illustrated in Fig. 7, the view being shown partially in elevation.
Fig. 10 is a perspective view, partially broken away in section, of a fuel rod and a coolant tube housing the same.

The side wall or shell of the cylindrical tank 37 is shown at 49 in Fig. 6 and is made of steel that is flanged at its opposite ends as indicated at 50 and 51. To these flanges are secured steel end walls 52 and 53 respectively, which walls also serve as tube sheets. The side wall of the tank 37 is lined on its inner face with aluminum as indicated at 54, and the end walls or tube sheets 52 and 53 are lined with aluminum as indicated at 55. Aluminum is less susceptible to corrosion by heavy water than steel and therefore is better suited for use as a lining. Uranium rods that, as shown in Fig. 10, comprise a plurality of jacketed bodies 56 laid end to end are disposed in tubes 57, which tubes in turn extend through the end walls of the tank 37 and constitute circulating passages through which cooling water may be passed for stabilizing the temperature of the chain reaction. As shown in Fig. 10, each tube 57 has internal ribs. The end walls or tube sheets 52 and 53 are perforated to accommodate the tubes 57. The tube sheets are supporting members for the tubes 57 and the uranium rods contained therein and thus have a substantial thickness.

A reflector 59 serves to reflect back into the heavy water moderator some of the neutrons that normally would escape from the system.

At each end of the cylindrical tank 37 are three chambers 60, 61, and 62 formed by spaced steel walls or tube sheets 63, 64, and 65 and circumferentially disposed steel shell walls 66, 67, and 68 respectively. The function of these chambers 60, 61, and 62 will be brought out presently.

The tubes 57 extend throughout the length of the tank 37 and continue through all of the end chambers 60 to 62 inclusive, passing through each of the tube sheets 63, 64, and 65. In the tank 37 perforated aluminum diaphragms 69 are interposed between the opposite tube sheets 52 and 53 through which pass the tubes 57. The diaphragms serve as intermediate supports for the tubes. This, of course, could be accomplished by other conventional means such, for example, as by hangers.

Referring to Figs. 4, 5, and 6 the reactor is supported on a cradle generally indicated at 73 that is disposed on the bottom 74 of a cylindrical steel tank or holder 75. This cradle 73 comprises spaced supporting members 76 which in turn rest on the bottom of the steel tank 75. Such a supporting member 76 is disposed under each of the tube sheets 52, 53, 63, 64, and 65. The tank bottom 74 rests on a concrete slab 78. A cylindrical concrete wall 79 (Fig. 5) about 10 feet thick extends upwardly from the concrete slab 78 and completely surrounds the cylindrical side wall 80 of the steel tank 75. The wall 80 of the tank 75 is lined with lead as indicated at 81. The steel tank 75 is about 70 to 80 feet in diameter and 40 to 60 feet high and is filled with light water 82 completely submerging the reactor 35 in the water. Thus effective neutron and gamma radiation shield 77 is provided, the concrete serving finally to absorb any radiations that may penetrate the water, lead and steel layers.

The aluminum tubes 57 as shown in Fig. 5 extend continuously from outside the concrete wall 79 through the concrete wall, lead liner 81, steel wall 80, and then project through the light water 82 into the end wall of the adjacent light water leakage chamber 62 (Fig. 6) and then continue through the intermediate chambers 61 and 60 and the reactor tank 37, terminating after passing through the most remote light water leakage chamber 62. These tubes may be internally ribbed so as to center the uranium rods and provide spaces or passages between the uranium rods and the walls of the tubes through which passages or channels cooling water may be circulated.

The cooling water thus passing through the tubes 57 enters the reactor through ring headers 97 (Figs. 4 and 5) and flows in a direction from left to right through the tubes, as shown in the drawings. The ring header 97 receives its supply of cooling water from the main supply pipe 41 (Fig. 4), which leads from a region lower than the lowest portion of the water in the holder or the tank 75.

The cooling water passing through the tubes 57 is discharged directly into the steel tank 75 and thus becomes part of the water shield. The shield water 82 in turn may be circulated through an external primary cooling circuit shown in Fig. 4. The water in this external cooling circuit may be cooled by being circulated in heat exchange relationship with a secondary cooling circuit. The primary cooling circuit comprises a pipe system 41 that draws light water 82 contained in tank 75 and then circulates this water through the outlet line 42, which leads from a region at the base of a holder 75 which is separate and spaced from the reactor tubes 57, and through the heat exchanger 44, and by means of pump 45 conveys the water through inlet line 41 and ring headers 97 into the tubes 57. This water is finally discharged out the open ends of tubes 57 into the body of water 82 contained in the tank.

The secondary cooling circuit comprises the heat exchanger 44 wherein heat is extracted from the hot water in the primary circuit, a pipe 99 that conveys the hot water in the secondary circuit to a cooling tower 100 where the water is cooled by evaporation, and a return pipe 101 that conveys the cooled secondary water stream back to the heat exchanger 44 in response to a circulating pump 102.

Rather than recirculate the cooling water in the primary circuit it may be preferred to pass only fresh water through the reactor. This may be advantageous where the reactor is situated close to a river or a large body of water. The coolant may then be introduced into the cooling circuit at 103 and be withdrawn at 104 and disposed of in any suitable manner. A water purifying and filtering plant may be required in such an arrangement. In the circuit shown a shut-off valve 105 would be in its "off" position under the circumstances.

In the event of failure of the circulating pump 45 or any other part of the primary cooling circuit, water 82 powered by its normal pressure head in the tank 75 will back up through the open ends of the tubes 57 so as to ensure the presence of cooling water at all times in heat exchange relationship with the uranium rods in the tubes 57. In this instance a separate supply of cooling water should be provided to maintain the necessary water level in the tank 75.

It may be desirable to float an immiscible hydrocarbon on top of the body of water in tank 75 to a depth sufficient to provide an effective radiation shield across the top of the tank.

Figure 7:
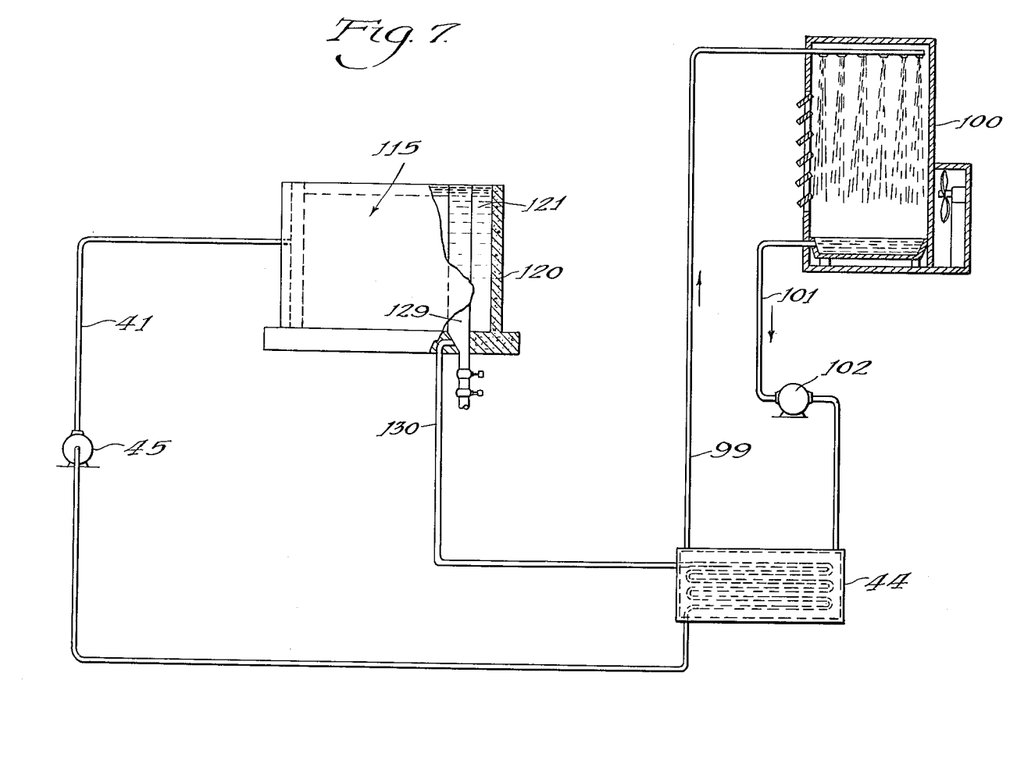
Fig. 7 is a schematic diagram illustrating still another embodiment of the invention.
Figure 9:
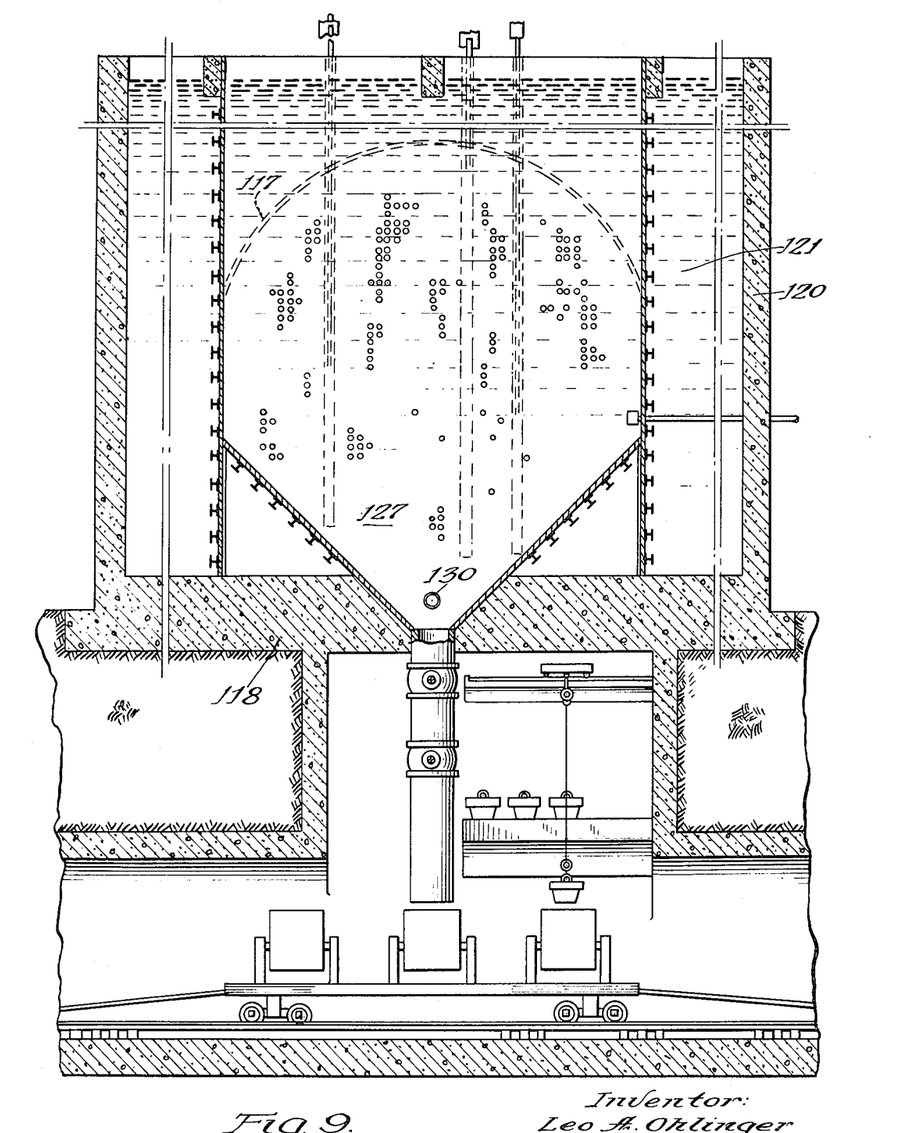
Fig. 9 is a vertical sectional view through the reactor of Fig. 8, taken on the line 9—9 of Fig. 8.

Referring to Figs. 7 to 9 inclusive, a third embodiment of the invention is shown wherein portions only of the reactor are immersed in water. A light water cooled, graphite moderated reactor is more or less diagrammatically illustrated at 115 and comprises a cylindrical structure (Figs. 8 and 9) built of graphite blocks through which a plurality of tubes are disposed. The bodies of fissionable material are contained in the tubes.

The reactor is surrounded with a graphite reflector 116 forming an extension of the moderator and is enclosed by a fluid tight steel casing 117 supported on I-beams 119 within a concrete tank or holder 120, erected on foundation 118. Tank 120 is filled with water 121 to act as a shield for neutron and gamma radiation.

The encased reactor is surrounded on all sides except one by the water 121, and the side not surrounded, which is to be the charging face 122 of the reactor is provided with a shield tank 123 filled, for example, with lead shot and water.

Coolant tubes 124 extend through the adjacent wall 125, through shield tank 123, through the graphite moderator shown at 115 to an outlet face 127 of casing 117 to empty into water 121 in tank 120. Only a few tubes 124 are shown in Fig. 8 for sake of clarity of illustration. A backing wall 129 is placed in tank 120 spaced from outlet face 127. The coolant tubes 124 are preferably of aluminum.

On the outside of tank 120 where the coolant tubes enter the reactor the ends of coolant tubes 124 are removably capped and are supplied with coolant under pressure from conveniently positioned manifolds. Thus water can be passed through tubes 124 to be discharged at outlet face 127 into tank 120. Water after passing through the reactor is removed from tank 120 through outlet pipe 130 which is spaced and separated from the coolant tubes 124.

The water thus removed through outlet pipe 130 may be passed through a heat exchanger and returned to the inlet ends of the tubes 115 in a manner similar to that shown in Fig. 4, that is, through the inlet pipe 41 from a region lower than the lowest portion of the water in the tank or holder 120.

Once again, in the event of failure of the cooling system the water 121 in tank 120 will flow in a reverse direction through the tubes 115 in heat exchange relationship with the uranium bodies in the tubes to ensure proper cooling. Though the entire reactor in this form of the invention is not immersed in water it is to be noted that a radiation shield is provided above the reactor and on the side corresponding to the discharge ends of the tubes by the water contained in tank 120.

What is claimed is:

In a neutronic system; a holder; a body of water in the holder; a reactor submerged in the body of water so as to be covered thereby at least on its top and sides, the reactor comprising a plurality of tubes opening at one end in the body of water well below the surface thereof and being closed at the other end to the body of water, a moderator surrounding the tubes and being capable of slowing fast neutrons to thermal energy, and bodies in the tubes containing a thermal-neutron-fissionable material, said bodies being spaced from the tube walls to provide passages; an inlet line connected with the tubes at their closed ends and leading from a region lower than the lowest portion of the water in the holder; a pump in the inlet line for causing water to flow from the inlet line through the tubes in the direction from the closed ends to the open ends thereof and into the body of water, the water flowing through the tubes cooling the reactor, the head of water above the tubes being sufficient to cause the water to flow in the opposite direction through the tubes and out through the inlet line for cooling the reactor in case of pump failure; and an outlet line completely separate from the tubes for removing heated water from the holder.

References Cited in the file of this patent

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

A General Account of the Development of Methods of Using Atomic Energy for Military Purposes Under the Auspices of the U. S. Government, 1940–1945, by H. D. Smyth (Aug. 1945), pp. 82–85, 102–104, 177–178.

Kelly et al.: Phy. Rev. 73, pp. 1135–9 (1948).